(12) United States Patent
Tani

(10) Patent No.: US 7,401,993 B2
(45) Date of Patent: Jul. 22, 2008

(54) PIPE MEMBER AND MANUFACTURING METHOD OF THE SAME

(75) Inventor: Yoshikazu Tani, Kita-ku (JP)

(73) Assignee: Tokiwa Corporation, Gifu (JP)

( * ) Notice: Subject to any disclaimer, the term of this patent is extended or adjusted under 35 U.S.C. 154(b) by 541 days.

(21) Appl. No.: 11/043,144

(22) Filed: Jan. 27, 2005

(65) Prior Publication Data
US 2005/0186020 A1    Aug. 25, 2005

(30) Foreign Application Priority Data
Feb. 19, 2004 (JP) .............................. 2004-043501
Dec. 20, 2004 (JP) .............................. 2004-368288

(51) Int. Cl.
  *A46B 11/04*    (2006.01)
  *A47B 13/22*    (2006.01)
(52) U.S. Cl. .................................................... 401/286
(58) Field of Classification Search ............. 401/282, 401/284, 286, 288, 290, 291
  See application file for complete search history.

(56) References Cited
U.S. PATENT DOCUMENTS
4,854,760 A  *  8/1989  Pike et al. ................... 401/134
D331,874 S  *  12/1992  Schmidt ...................... D9/724
5,851,079 A  *  12/1998  Horstman et al. ........... 401/174

FOREIGN PATENT DOCUMENTS
JP         10-165878         6/1998

* cited by examiner

*Primary Examiner*—Huyen Le
(74) *Attorney, Agent, or Firm*—Bacon & Thomas, PLLC

(57) ABSTRACT

To provide an injection molded pipe member having a high quality, the pipe member is integrally provided with a holder portion (20), a pipe portion (30) and ribs (40) arranged in an outer periphery of the pipe portion (30) at a uniform interval in peripheral direction, protruding in radial direction and reaching the holder portion (20) from a middle of the pipe portion (30), and has a resin injecting position (20*f*) in a surface of a portion except the pipe portion (30) and the ribs (40), so that molten resin flows quickly through the forming space uniformly in peripheral direction without being deflected when injection molding, thereby bend of the pipe portion (30), thickness shrink, and forming die breakage is prevented.

1 Claim, 14 Drawing Sheets ved in the rear end surface of the holder portion, the injecting pressure is applied to the pipe portion more uniformly, and the pipe portion is further prevented from being bent.

PIPE MEMBER AND MANUFACTURING METHOD OF THE SAME

TECHNICAL FIELD

The present invention relates to a pipe member which preferably supplies a liquid filler filled in a filling region in an inner portion of a container and extruded toward a leading end side, to a brush in a leading end of the container, and a manufacturing method of the pipe member.

BACKGROUND ART

In conventional, as a structure for supplying a liquid filler filled in a filling region in an inner portion of a container, to a brush in a leading end of the container, there has been known a structure obtained by integrally forming a ring-like base portion (a holder portion) attached to a leading end side within a container, and a tubular portion (a pipe portion) in which a rear end is connected to the base portion and a leading end is inserted to a brush (for example, refer to Japanese Unexamined Patent Publication No. 10-165878). In the structure mentioned above, it is necessary to make the pipe portion thin in order to make an outer diameter of the brush smaller.

In this case, the integrally formed product constituted by the holder portion and the pipe portion is generally formed in accordance with an injection molding. In this injection molding, the integrally formed product mentioned above is obtained by preparing a forming die provided with shapes corresponding to the holder portion and the pipe portion, injecting a molten resin through a resin injecting port provided in a portion of the forming die in correspondence to a rear end surface of the holder portion at a predetermined pressure, and releasing from the mold after being solidified.

However, in the integrally formed product mentioned above, since the pipe portion is thin and long, the molten resin from the holder portion is hard to uniformly flow toward the leading end of the cylinder portion of the pipe portion, and a difference is generated in a cooling time between the cylindrical portion through which the resin first flows and the cylinder portion through which the resin flows later, so that the pipe portion is curved after being cooled and solidified. Further, in the case of forming at a higher pressure than necessary in order to uniformly fill the molten resin in the pipe portion, an excessive load is applied to a narrow core pin for forming an inner peripheral surface of the pipe portion so as to bend the core pin, and the forming die is broken.

SUMMARY OF THE INVENTION

The present invention is made for the purpose of solving the problem mentioned above, and an object of the present invention is to provide a high quality pipe member provided with a pipe portion having no bend, and a manufacturing method of the same.

In accordance with the present invention, there is provided a pipe member for supplying a liquid filler filled in a filling region in an inner portion of a container and extruded toward a leading end side, to a brush in a leading end of the container, comprising:

a holder portion which is attached to the inner portion of the container and is provided with a discharge hole for discharging the liquid filler in the filling region to the leading end side;

a pipe portion in which a rear end is supported to the holder portion and communicates with the discharge hole, and a leading end is inserted to the brush; and a plurality of ribs which are provided in an outer periphery of the pipe portion at an approximately uniform interval in a peripheral direction, protrude in a radial direction and reach the holder portion from a middle position in an axial direction of the pipe portion, wherein the holder portion, the pipe portion and the ribs are integrally provided, and are formed as an injection molded product in which a resin injecting position exists on a surface except the pipe portion and the ribs.

Further, in accordance with the present invention, there is provided a manufacturing method of a pipe for manufacturing the pipe member comprising the steps of:

preparing a molding die which is provided with a shape corresponding to a shape of a pipe member, and has a resin injecting port on a surface corresponding to a portion except a pipe portion and ribs;

injecting a molten resin into the forming die through the resin injecting port; and releasing the pipe member from the die after being solidified.

In accordance with the pipe member and the manufacturing method of the same mentioned above, when injecting the molten resin from the resin injecting position existing on the surface except the pipe portion and the ribs of the pipe member, the molten resin flows toward the rib forming spaces which are arranged approximately uniformly in the peripheral direction, quickly flows uniformly through the forming space from the rib forming space having a large flow rate and the rear end of the pipe portion communicating therewith to the middle position in the axial direction without being deflected in the peripheral direction, and reaches the leading end of the pipe portion forming space in the leading end side therefrom before the deflection is generated in the peripheral direction, on the basis of a short flow path length of the forming space. Accordingly, the injecting pressure is uniformly applied to the pipe portion so as to prevent the pipe portion from being bent. Further, since the thickness difference between the pipe portion in the leading end side with no rib and the pipe portion including the ribs in the rear end side therefrom is approximately set to only the rib portion, the thickness is uniformed between the leading end side and the rear end side in comparison with the structure in which the pipe portion including the ribs is formed as the thick cylinder for the purpose of making it easy to flow the molten resin, the injecting pressure is uniformly applied to the pipe portion, and it is possible to inhibit a thickness shrink mark (including a void) which may be generated due to the large thickness difference from being generated. Further, a rigidity of the pipe portion is increased by the ribs mentioned above. Further, since it is unnecessary to inject at the higher pressure than necessary, and no load is applied to the core pin having the small diameter and the large length, the forming die is prevented from being broken, and it is possible to prevent a burr from being generated due to an abrasion of the forming die.

Further, in the case that the resin injecting position is pro-

Further, in the case that the resin injecting position is provided at the position corresponding to the ribs on the rear end surface of the holder portion, the injecting pressure is applied to the pipe portion further more uniformly, and the pipe portion is further prevented from being bent.

Further, in the case that the length in the radial direction of the ribs is gradually made longer toward the rear end from the leading end, it is possible to make it easy to quickly flow the molten rein toward the leading end, and the pipe portion is further prevented from being bent.

Further, in the case that the pipe portion is structured to be inserted to the brush from the middle position in the axial direction to the leading end, the rib formed as the flow path for the molten resin and having the large flow rate is made longest in the axial direction, and the pipe portion is further prevented from being bent.

Further, in the case that three ribs are provided at approximately the uniform interval along the peripheral direction, it is possible to obtain both the advantages that the pipe portion is prevented from being bent and the thickness shrink is inhibited from being generated.

As mentioned above, in accordance with the pipe member and the manufacturing method of the same in accordance with the present invention, since the injecting pressure can be uniformly applied to the pipe portion, it is possible to prevent the bend and the thickness shrink. Further, since no load is applied to the core pin having the small diameter and the large length, it is possible to prevent the forming die from being broken, and it is possible to prevent the burr from being generated due to the abrasion of the forming die. Accordingly, it is possible to provide the pipe member in which the quality is improved, and the manufacturing method of the same.

DESCRIPTION OF THE PREFERRED EMBODIMENT

Figure 1:
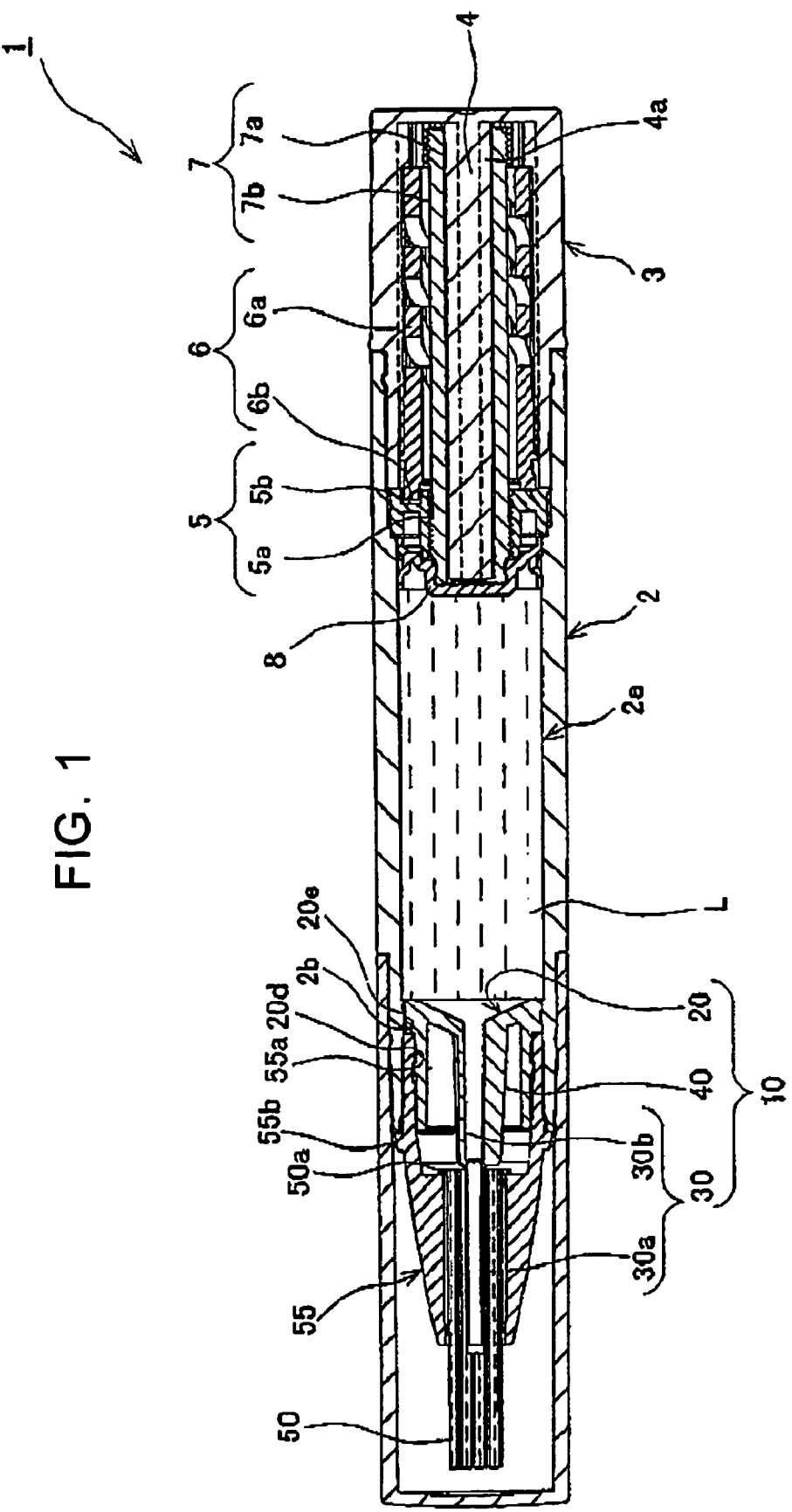
FIG. 1 is a longitudinal cross sectional view showing a liquid filler extruding container provided with a pipe member in accordance with a first embodiment of the present invention, and shows a state diagram before advancing a piston.
Figure 2:
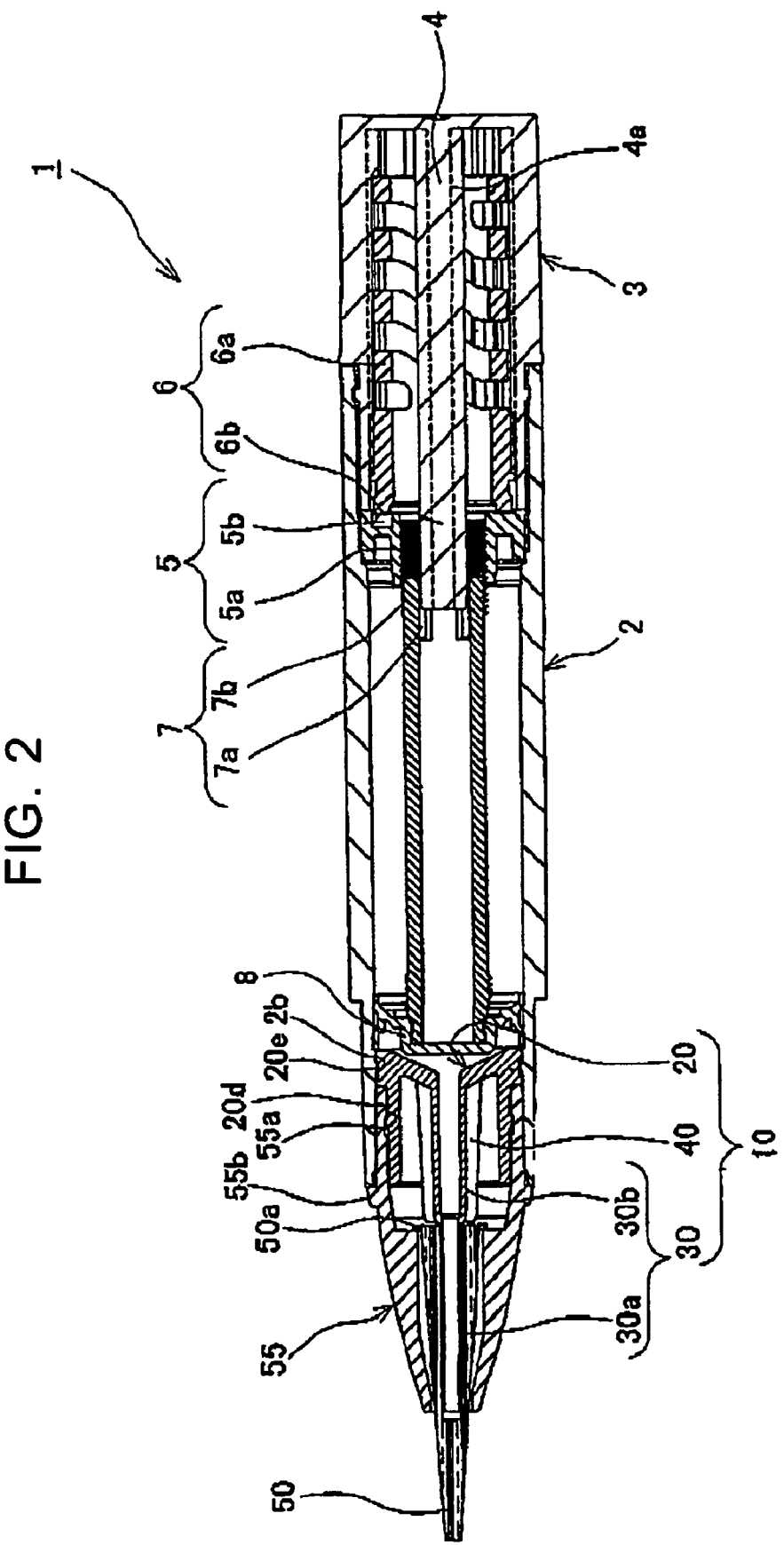
FIG. 2 is a longitudinal cross sectional view in a direction orthogonal to FIG. 1, and shows a state diagram in which the piston is advanced to a forward limit.

A description will be given below of a preferable embodiment of a pipe member and a manufacturing method of the same in accordance with the present invention with reference to FIGS. 1 to 14. In this case, in each of the drawings, the same reference numerals are attached to the same elements, and an overlapping description will be omitted. FIGS. 1 and 2 are respective views showing a liquid filler extruding container provided with a pipe member in accordance with an embodiment of the present invention, FIGS. 3 to 6 are respective views showing the pipe member, and FIGS. 7 to 11 are respective views showing a forming die of the pipe member. The liquid filler extruding container in accordance with the present embodiment receives a liquid filler and such liquid filler can be appropriately extruded by a user. The liquid filler can be a lip stick, a lip gloss, an eye color, an eye liner, a lotion, a cleaning solvent, a nail enamel, a nail care solution, a nail enamel remover, a mascara, an anti-aging, a hair color, a hair cosmetic, an oral care, a massage oil, a keratotic plugging reducer, an ink for a writing instrument such as a marking pen or the like, a liquid drug medicine, a slurry, a shoe polish and the like.

First, a description will be given of an outline structure of the liquid filler extruding container. As shown in FIGS. 1 and 2, a liquid filler extruding container 1 is provided with a cylindrical main body tube 2 having therein a filling region 2a in which a liquid cosmetic material L is filled, and a closed-end cylindrical operating tube 3 which is provided in a rear end portion of the main body tube 2 so as to be relatively rotatable, as an outer structure. Further, the liquid filler extruding container is provided with a columnar shaft body 4 which is provided in a standing manner in a closed-end portion of the operating tube 3 and has a rotation prevention 4a extending in an axial direction and formed on an outer peripheral surface thereof, a collared cylindrical tubular body 5 which is engaged with the main body tube 2 so as not to be rotatable (so as to be synchronously rotatable), has a female thread 5a formed in an inner peripheral surface thereof and is provided with a ratchet gear 5b in a rear end surface thereof, a cylindrical ratchet spring portion 6 which is arranged between the tubular body 5 and the operating tube 3, is engaged with the operating tube 3 so as not to be rotatable, is provided with a ratchet gear 6b engaging with the ratchet gear 5b of the tubular body 5 in a leading end surface thereof, and has a compression spring portion 6a formed in a rear portion side from the ratchet gear 6b such that the ratchet gears are engaged with each other, and a cylindrical movable body 7 which is outside inserted to the shaft body 4 so as to pass through the tubular body 5 and the ratchet spring portion 6, has a rotation prevention 7a engaging with the rotation prevention 4a of the shaft body 4 and formed in a rear end portion of an inner peripheral surface thereof, and has a male screw 7b engaging with the female thread 5a of the tubular body 5 and formed in an outer peripheral surface thereof so as to extend in an axial direction, as an extruding mechanism of the liquid filler.

Further, in the liquid filler extruding container 1, when the user relatively rotates the main body tube 2 and the operating tube 3, the moving body 7 executes a straight movement to the leading end side in accordance with an engaging mechanism constituted by the male screw 7b of the moving body 7 and the female thread 5a of the tubular body 5, a rotation preventing mechanism constituted by the rotation prevention 4a of the shaft body 4 and the rotation prevention 7a of the moving body 7, and a ratchet mechanism constituted by the ratchet gears 5b and 6b of the tubular body 5 and the ratchet spring portion 6 and the compression spring portion 6a and allowing one-way rotation, a piston 8 provided in the leading end of the moving body 7 slides in the filling region 2a in a watertight manner in accordance with the straight movement, and the liquid filler L within the filling region 2a is sequentially extruded.

Next, a description will be given of a pipe member 10 attached to the leading end side within the main body tube 2 and featuring the present embodiment. The pipe member 10 is structured for supplying (discharging) the liquid filler L extruded toward the leading end side from an inner side of the filling region 2a to a brush 50 attached to the leading end of the main body tube 2.

The pipe member 10 is an injection molded product which is integrally provided with a holder portion 20 attached to the main body tube 2, a pipe portion 30 supported to the holder portion 20, and a plurality of ribs provided at predetermined positions in an outer periphery of the pipe portion 30, as shown in FIGS. 1 to 6, and is structured, for example, by a high density polyethylene (HDPE), a straight chain low density polyethylene (LLDPE), a low density polyethylene (LDPE), a polypropylene (PP), a polyacetal (POM) or the other plastic materials.

Figure 3:
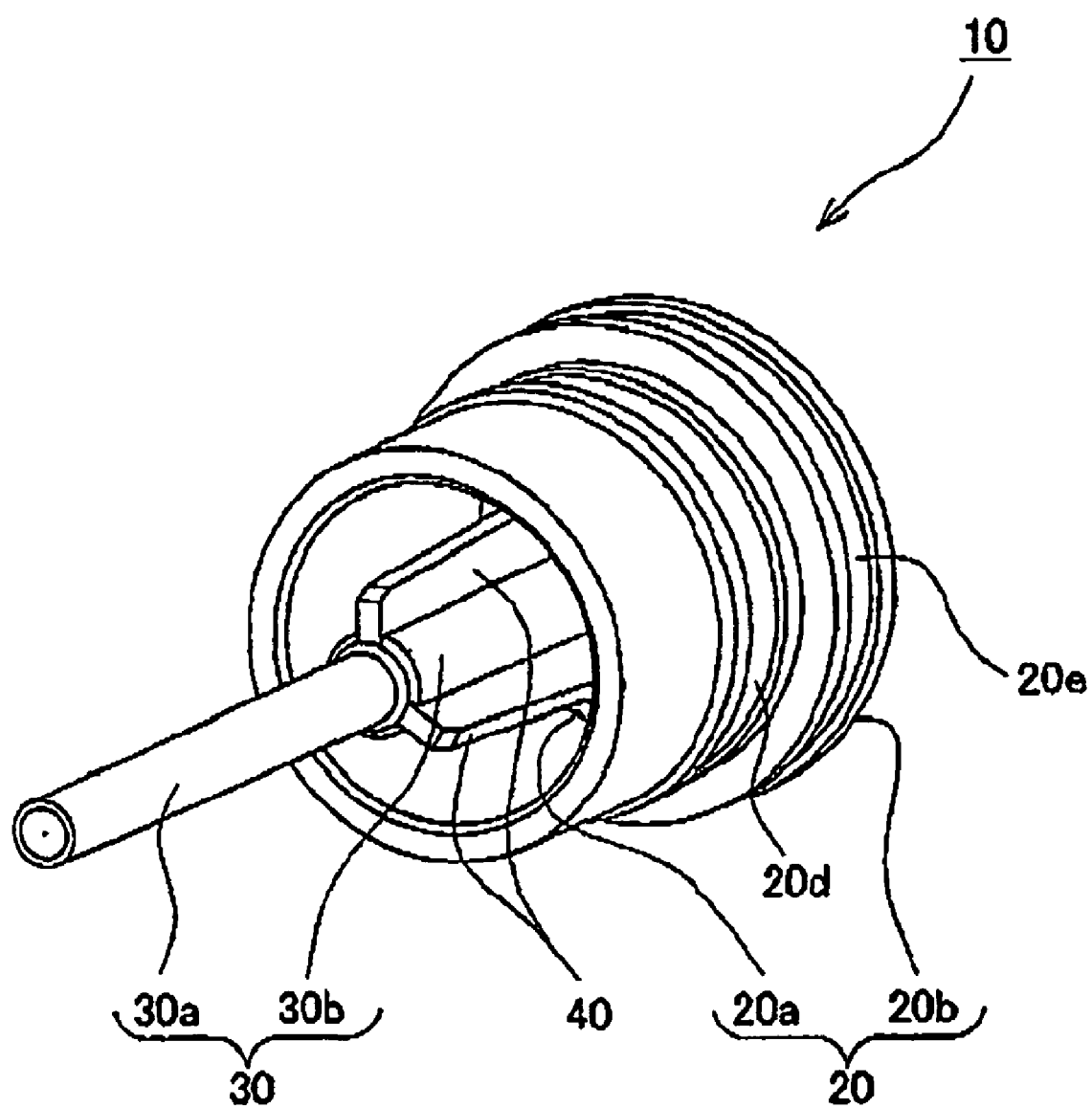
FIG. 3 is a forward perspective view showing the pipe member in FIGS. 1 and 2.
Figure 4:
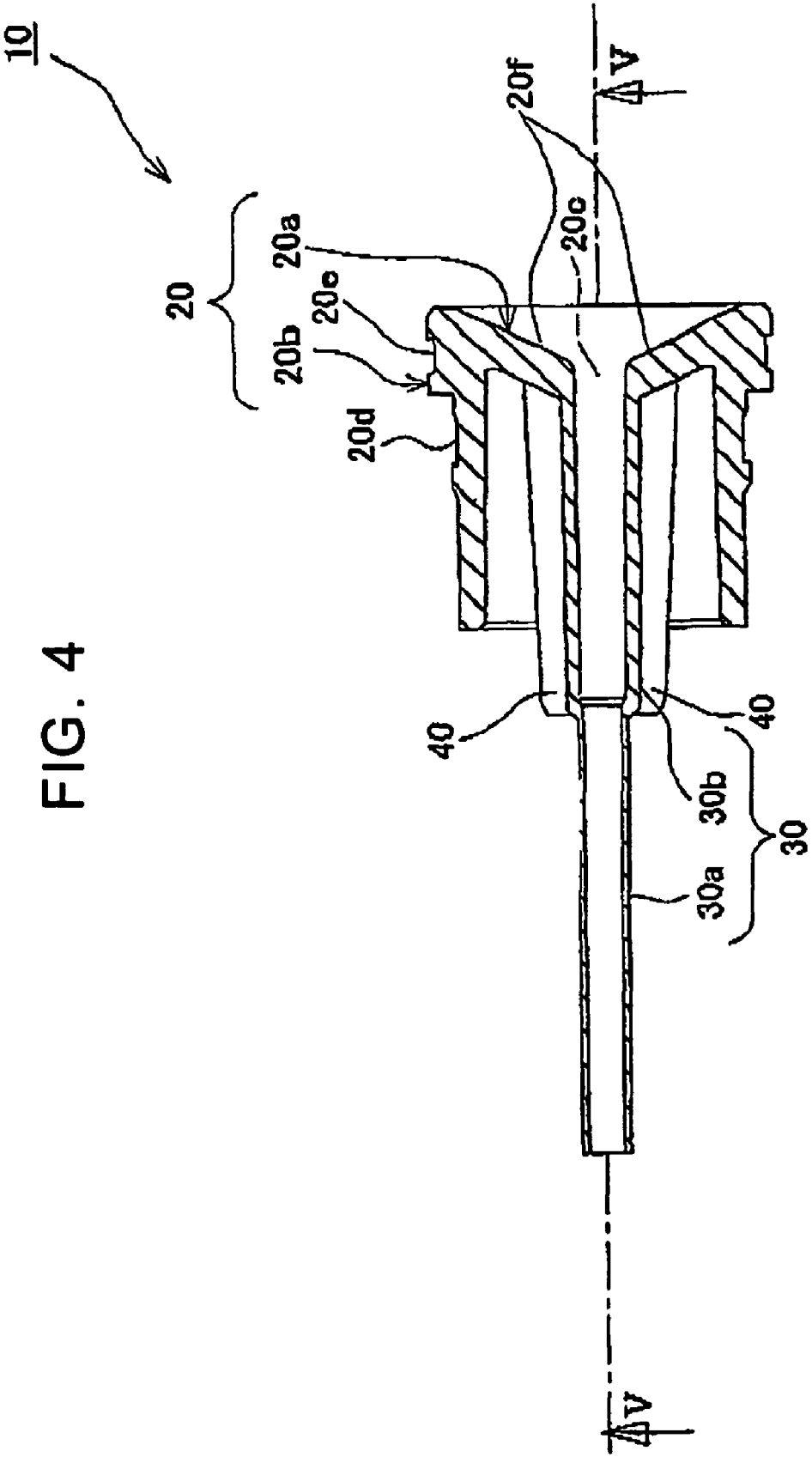
FIG. 4 is a longitudinal cross sectional view of the pipe member shown in FIG. 3.
Figure 5:
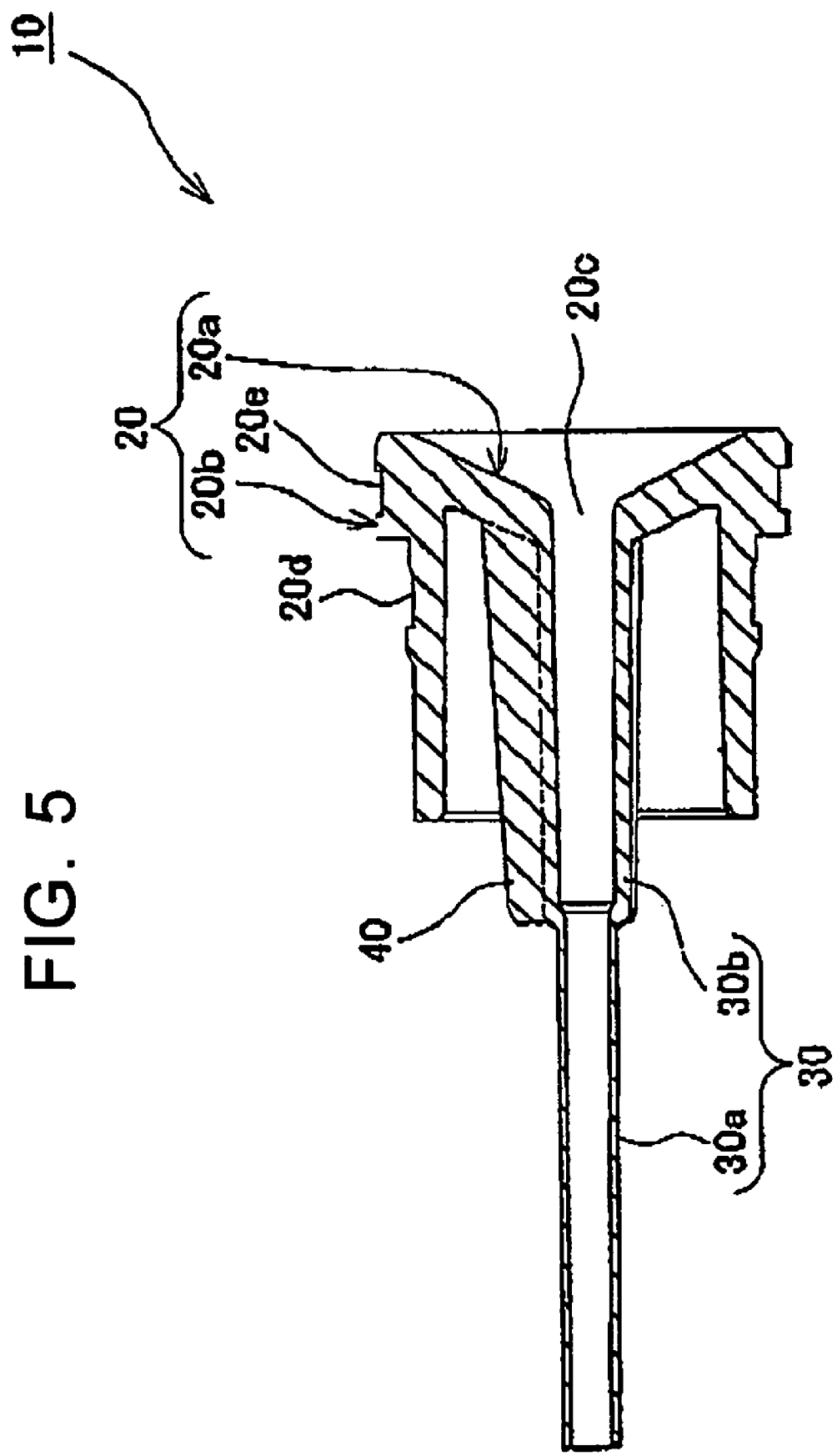
FIG. 5 is a view as seen from an arrow V-V in FIG. 4.

The holder portion 20 is provided with an approximately cone-shaped lid portion 20a in which a rear end side is broaden toward the end, and an installation portion 20b continuously provided in a peripheral edge portion of the lid portion 20a, as shown in FIGS. 3 to 6. The lid portion 20a is structured such that a rear end surface forms a leading end surface of the filling region 2a, and a discharge hole 20c for discharging the liquid filler in the filling region 2a to the leading end side is provided in a center of the lid portion 20a, as shown in FIGS. 4 and 5.

The installation portion 20b is structured in an approximately cylindrical shape protruding toward the leading end side from the peripheral edge portion of the lid portion 20a, as shown in FIGS. 3 to 6, is provided with an annular groove portion 20e for attaching to the main body tube 2 in an outer peripheral surface of a rear end portion thereof, as shown in FIGS. 3 to 5, and is provided with an annular groove portion 20d for attaching a brush holder 55 (refer to FIGS. 1 and 2) mentioned below in an outer peripheral surface of a center portion thereof.

The pipe portion 30 is structured such that a portion from a leading end to an approximately center at a middle position in an axial direction is formed as a cylinder portion 30a having a small thickness and a small diameter (for example, a thickness of about 0.05 to 0.5 mm, and an outer diameter of about 0.5 to 3 mm), a portion from the approximately center at the middle position in the axial direction to a rear end side is formed as a cylinder portion 30b in which an inner diameter and a thickness are set to be slightly larger than those of the cylinder portion 30a, and a rear end of the cylinder portion 30b is continuously provided with the lid portion 20a of the holder portion 20 so as to be supported and communicates with the discharge hole 20c, as shown in FIGS. 4 and 5.

The ribs 40 are structured, as shown in FIGS. 3 to 6, such that three ribs are continuously provided in an outer peripheral surface of the cylinder portion 30b of the pipe portion 30 at an approximately uniform interval (at approximately 120 degree) in a circumferential direction so as to protrude in a radial direction, and are continuously provided so as to reach the lid portion 20a of the holder portion 20, as shown in FIGS. 4 and 5. In the ribs 40, a length in a radial direction is set to be gradually longer toward a rear end from a leading end.

Figure 6:
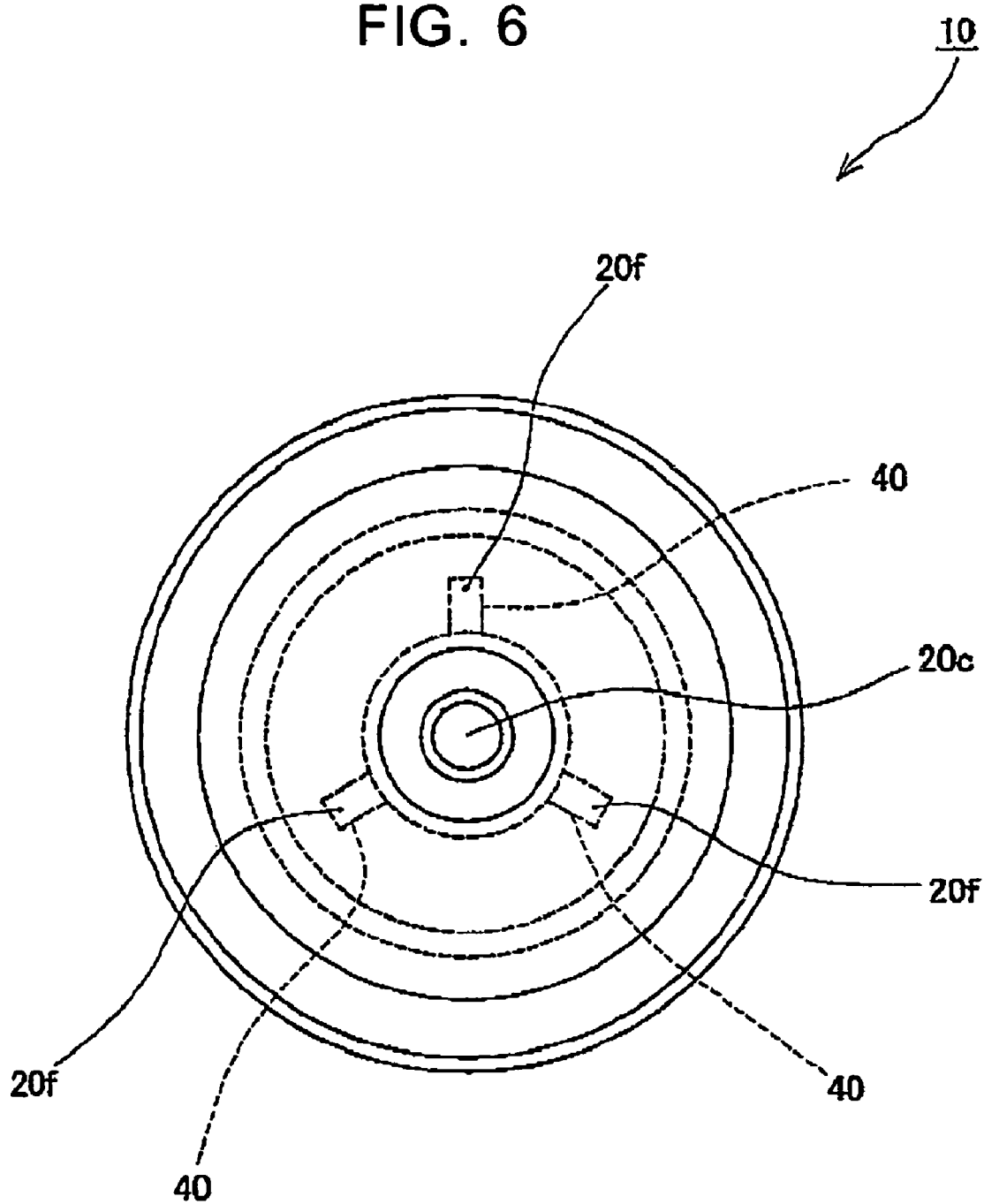
FIG. 6 is a back view of the pipe member shown in FIG. 3.

In the pipe member 10 having the structure mentioned above, as shown in FIG. 4, three positions corresponding to the ribs 40 in the rear end surface of the lid portion 20a of the holder portion 20 are formed as resin injecting positions 20f as shown in FIGS. 4 to 6 (which will be in detailed described later). Further, the pipe member 10 is inside inserted to the leading end portion of the main body tube 2, as shown in FIGS. 1 and 2, and the annular groove portion 20e of the installation portion 20b is engaged with the annular protruding portion 2b formed in the inner peripheral surface of the leading end portion of the main body tube 2, thereby being attached to the main body tube 2 in a watertight manner, and the filling region 2a receiving the liquid filler L is defined between the rear end surface of the lid portion 20a of the pipe member 10 and the piston 8, as shown in FIG. 1.

As shown in FIGS. 1 and 2, the brush 50 is attached to the brush holder 55. The brush holder 55 is structured in an approximately cylindrical shape and is tapered toward the leading end side, an inner peripheral surface in the leading end side is formed as a small-diameter hole inserting the brush 50, an inner peripheral surface in a rear portion side therefrom is formed as a large-diameter hole, and an annular protruding portion 55a is provided in a peripheral surface of the large-diameter hole.

The brush 50 is structured by bundling respective rear end portions of brushes and welding them so as to bring them together, a rear side portion than the leading end portion is inside inserted to the small-diameter hole of the brush holder 55 in such a manner that a leading end portion thereof protrudes from a leading end of the brush holder 55, and a bundled rear end portion 50a is firmly fixed to a peripheral edge portion of a rear end of the small-diameter hole in the brush holder 55, whereby the brush 50 is attached to the brush holder 55.

In the brush holder 55 provided with the brush 50, a portion provided with the large-diameter hole is inside inserted to the leading end portion of the main body tube 2 and is outside inserted to the installation portion 20b of the pipe member 10, and an annular collar portion 55b formed in an outer peripheral surface thereof is brought into contact with the leading end portion of the main body tube 2, and the annular protruding portion 55a is engaged with the annular groove portion 20d of the installation portion 20b of the pipe member 10, whereby the brush holder 55 is attached to the main body tube 2 via the pipe member 10. Further, in this state, the pipe member 10 is set in a state in which the cylinder portion 30a (the portion having no rib 40) in the leading end side of the pipe portion 30 is inserted to the middle of the brush 50, and the leading end of the pipe member 10 is positioned near the leading end surface of the brush holder 55.

Figure 7:
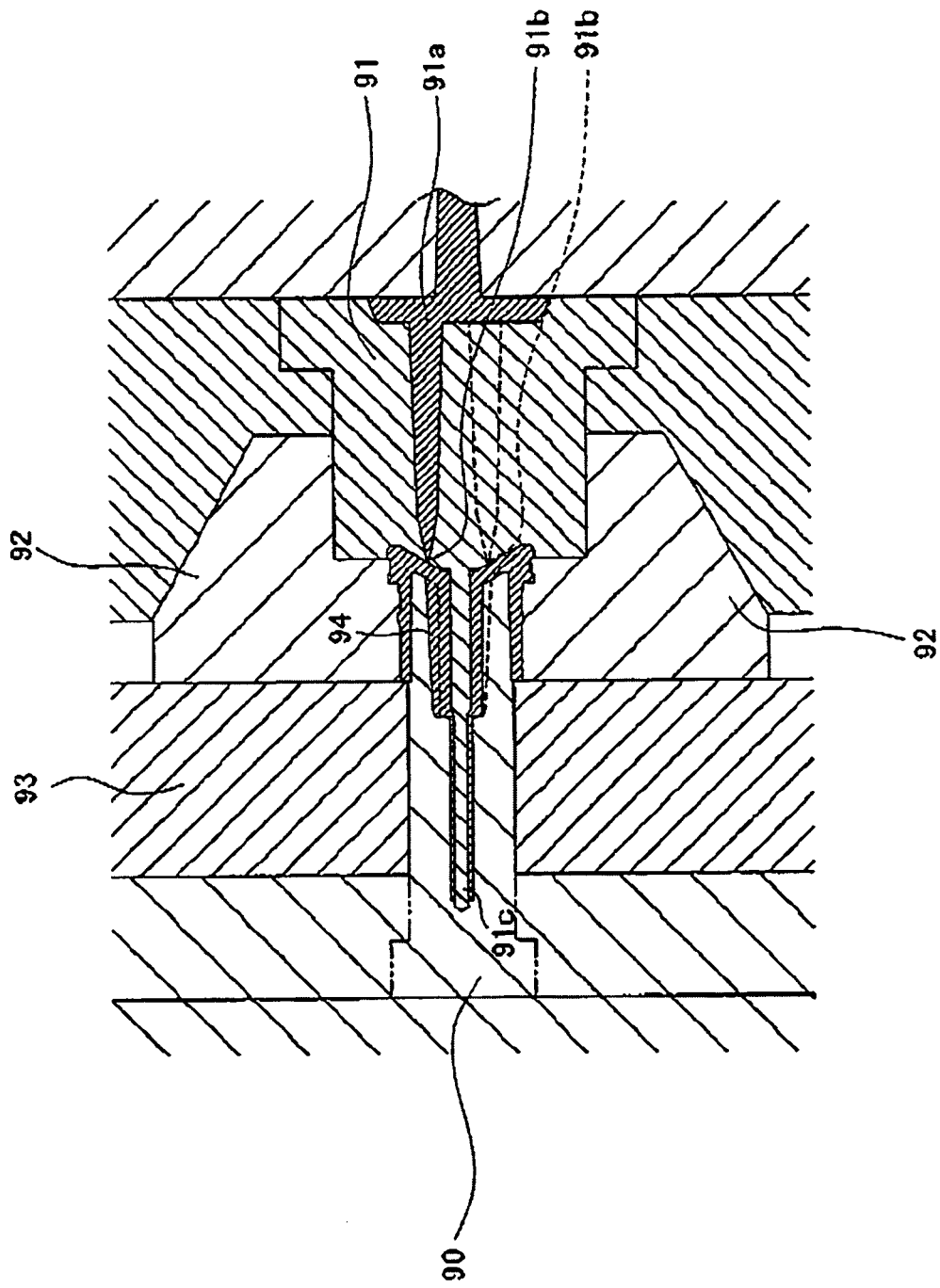
FIG. 7 is a vertical cross sectional view showing a forming die structure used for manufacturing the pipe member shown in FIGS. 3 to 6.
Figure 8:
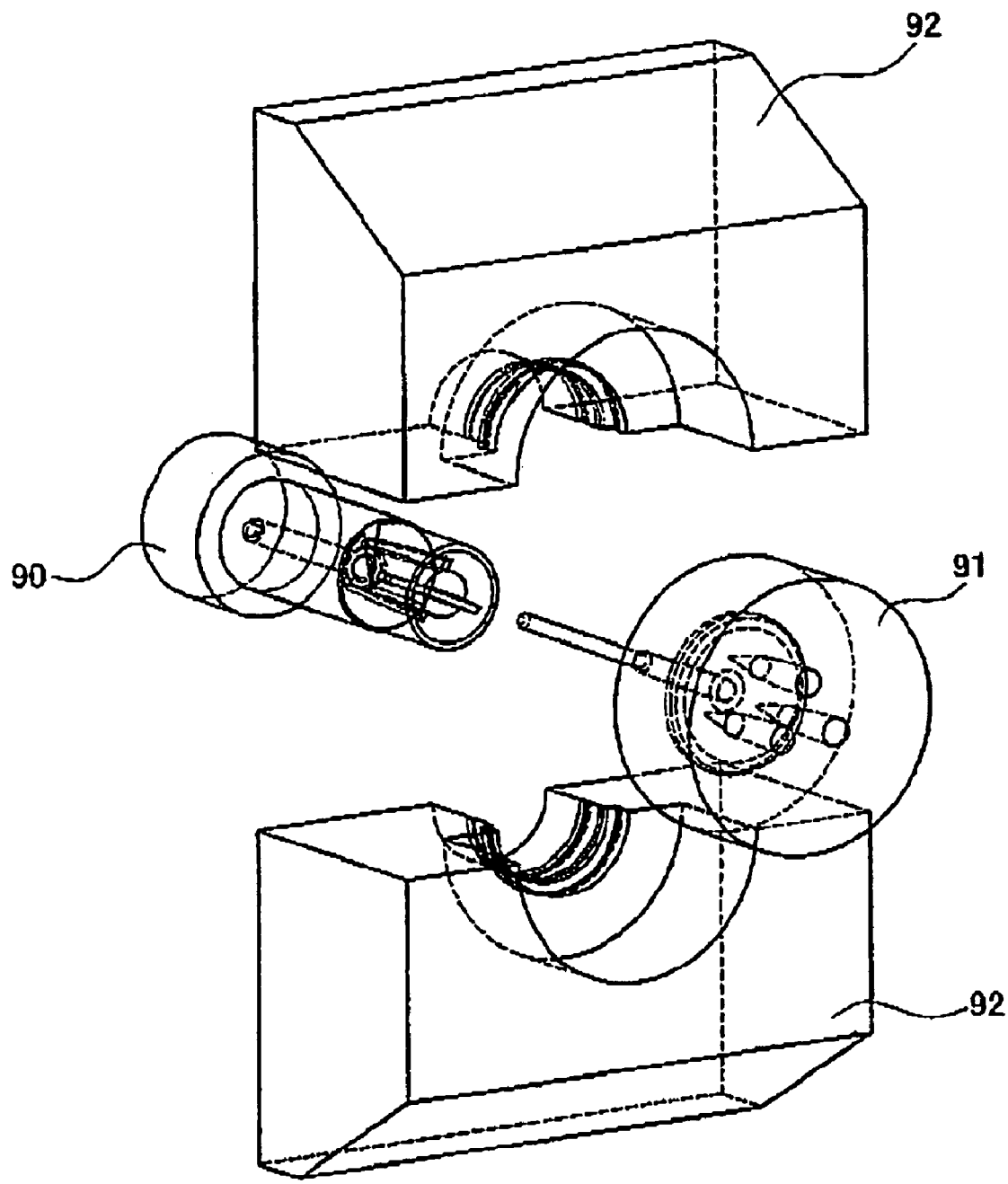
FIG. 8 is an exploded perspective view of the forming die structure shown in FIG. 7.
Figure 9:
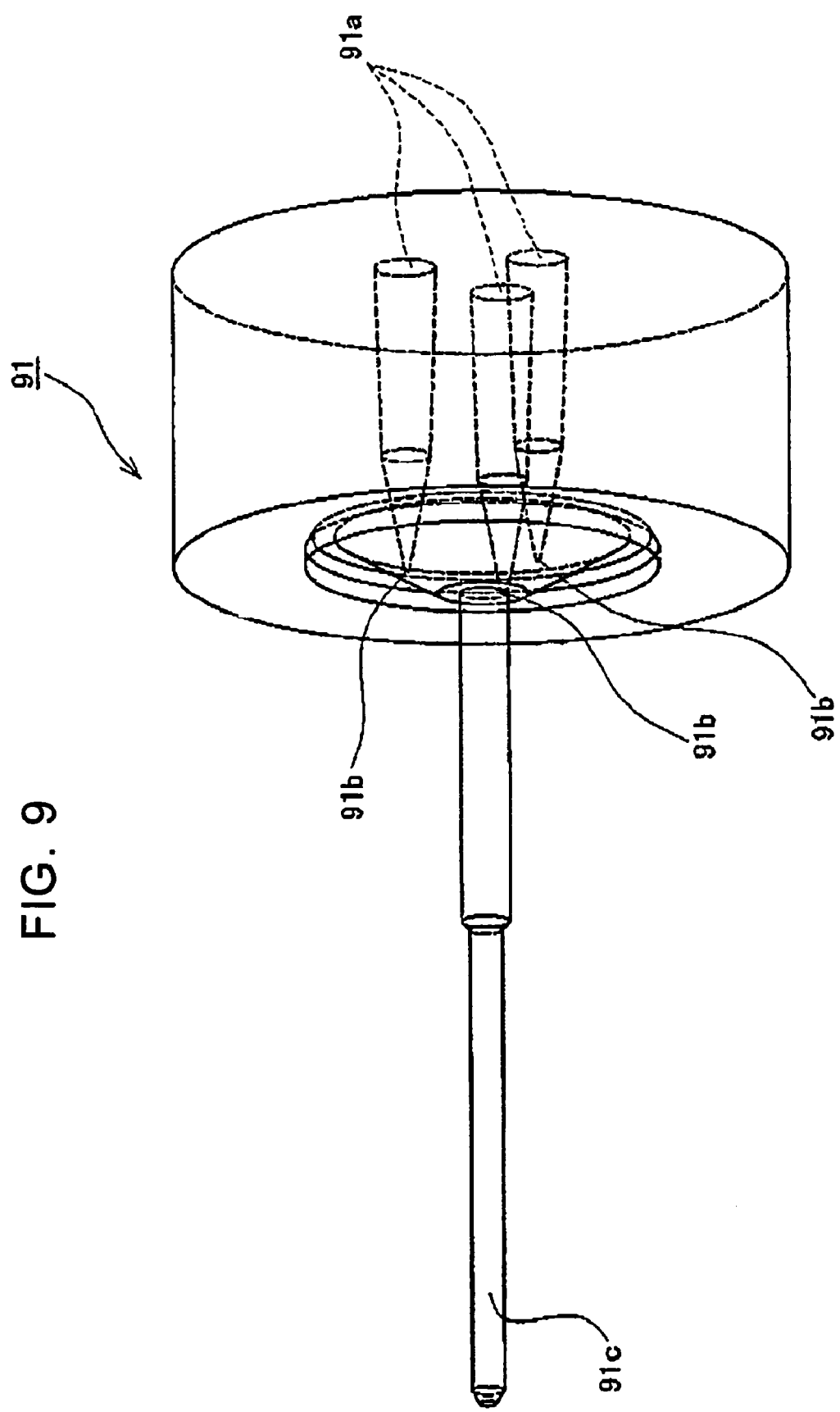
FIG. 9 is a perspective view showing a fixed side core in FIGS. 7 and 8.
Figure 10:
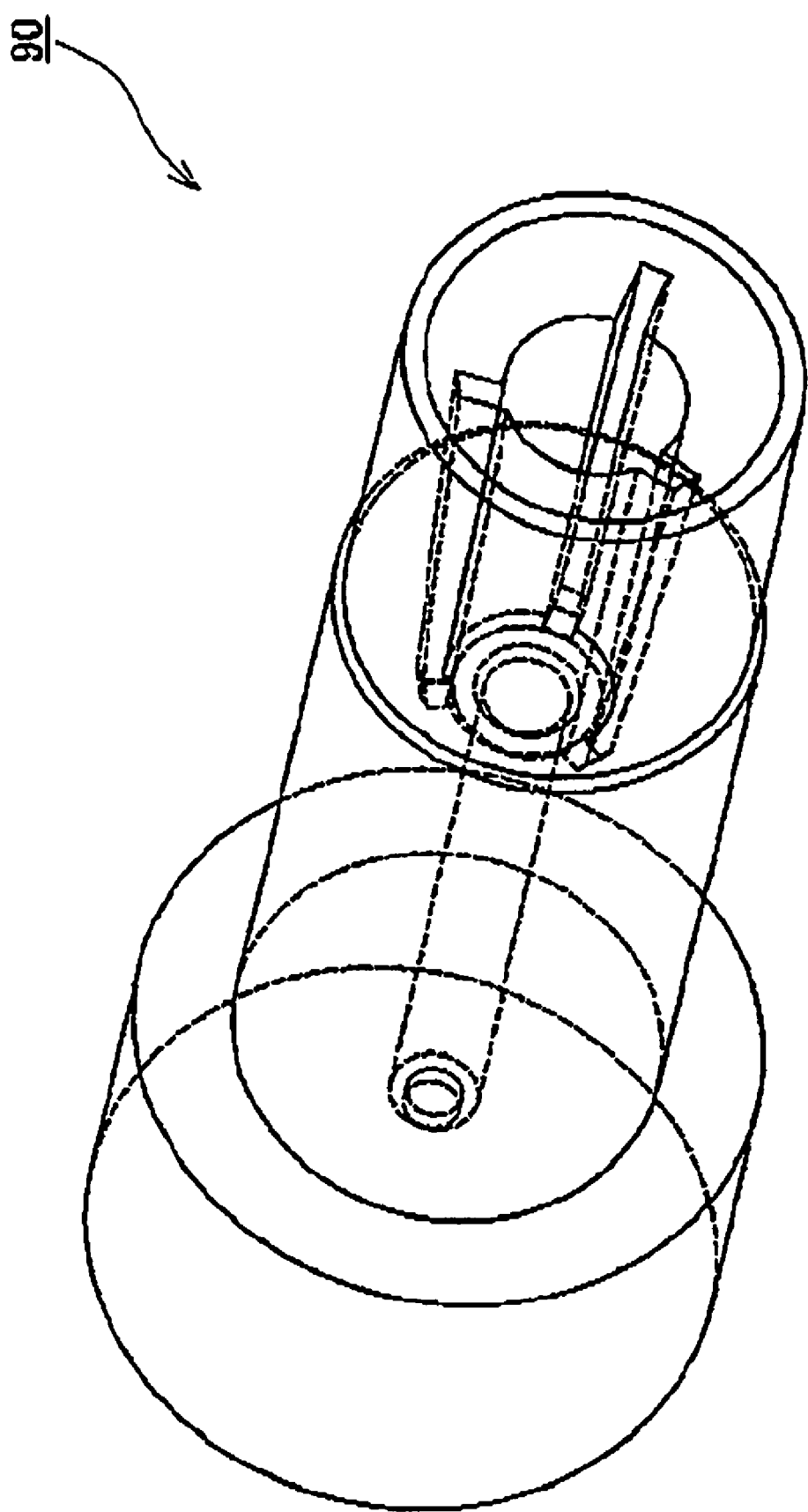
FIG. 10 is a perspective view showing a movable side core in FIGS. 7 and 8.
Figure 11:
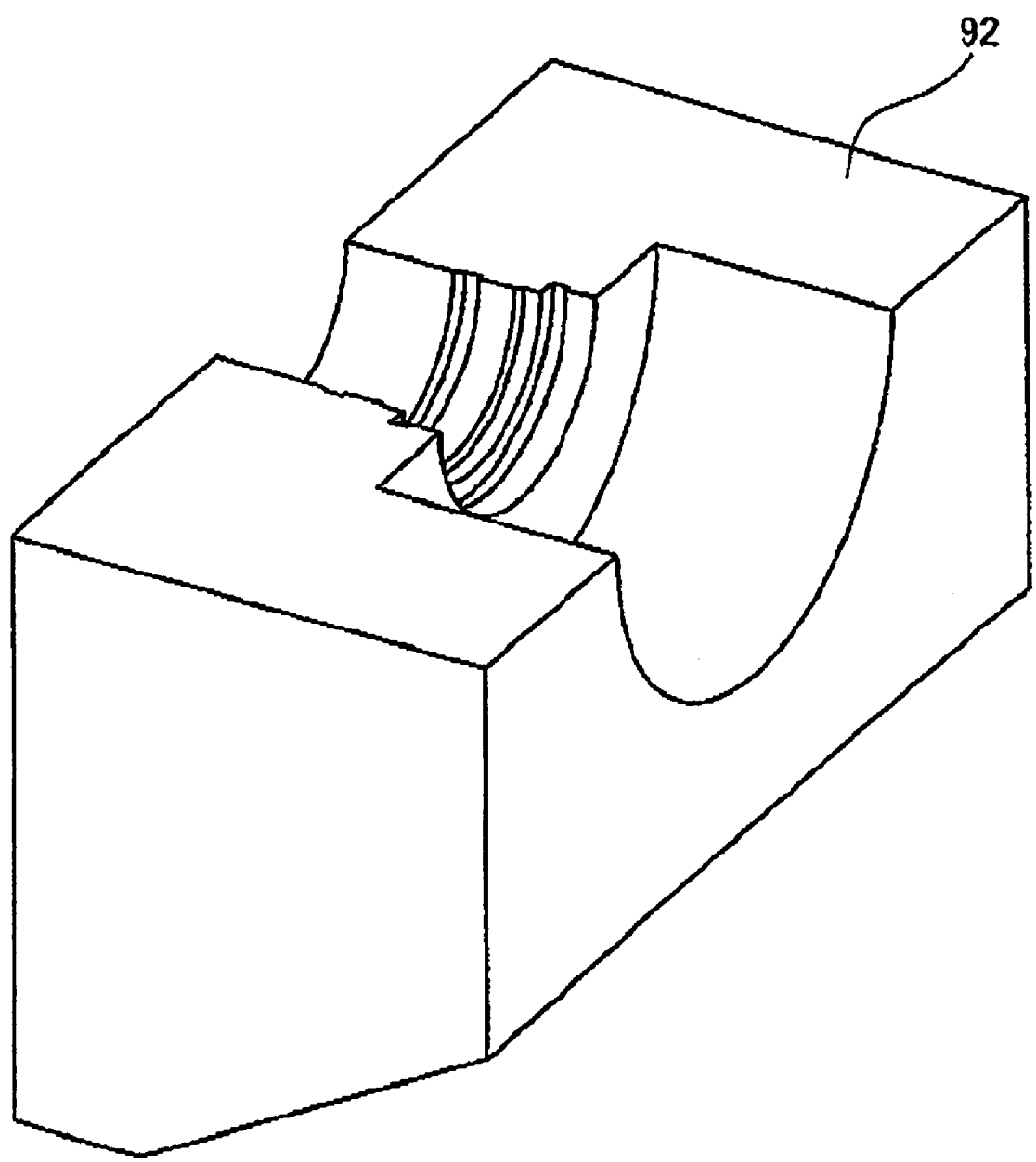
FIG. 11 is a perspective view showing one side of split type blocks in FIGS. 7 and 8.

Next, a description will be given of an injection molding for manufacturing the pipe member 10 having the structure mentioned above. FIG. 7 is a vertical cross sectional view showing a forming die (a metal mold) structure used for manufacturing the pipe member shown in FIGS. 3 to 6, FIG. 8 is an exploded perspective view of the forming die structure shown in FIG. 7, FIG. 9 is a perspective view showing a fixed side core in FIGS. 7 and 8, FIG. 10 is a perspective view showing a movable side core in FIGS. 7 and 8, and FIG. 11 is a perspective view showing one side of split type blocks in FIGS. 7 and 8. First, a forming space 94 for the pipe member 10 is formed, as shown in FIG. 7, by assembling a movable side core 90 (refer to FIGS. 7, 8 and 10) serving as a forming die for forming outer peripheral surfaces of the pipe portion 30 and the ribs 40 of the pipe member 10 and forming an inner peripheral side surface of the installation portion 20b of the holder portion 20, a fixed side core 91 (refer to FIGS. 7 to 9) serving as a forming die having a convex shape for forming an inner peripheral surface of the pipe portion 30 and a rear end surface of the lid portion 20a of the holder portion 20, and split type blocks 92 and 92 (refer to FIGS. 7, 8 and 11) serving as a forming die for forming an outer peripheral side surface of the installation portion 20b of the holder portion 20.

The fixed side core 91 mentioned above is provided with respective resin injecting ports 91b for injecting a molten resin to the forming space 94 from an outer side of the fixed side core 91 through three runners 91a at three positions (opposing positions) in correspondence to the ribs 40 in the portion forming the rear end surface of the holder portion 20, as shown in FIGS. 7 to 9. Further, the fixed side core 91 is provided with a core pin 91c having a small diameter and a large length and forming the inner peripheral surface of the pipe portion 30.

Further, the molten resin is injected to the forming space 94 through the resin injecting port 91b at a predetermined pressure. Then, the molten resin is immediately moved toward the forming space for the ribs 40 (a flow path for forming the ribs 40) at three positions opposing to the resin injecting ports 91b at three positions, and flows through the forming space for the ribs 40 having a large flow rate, and the forming space for the cylinder portion 30b of the pipe portion 30 (the cylinder portion continuously provided with the ribs 40) communicating therewith. Accordingly, the molten resin quickly flows uniformly through the forming space for the ribs 40 and the cylinder portion 30 of the pipe portion 30 (the forming space in which the flow path is widely enlarged at a degree of three ribs 40 in comparison with the conventional structure) uniformly without being deflected in the peripheral direction, thereby reaching the leading end of the forming space for the cylinder portion 30a in the leading end side before the deflection is generated in the peripheral direction on the basis of a short length of the flow path of the cylinder portion 30a (which is shorter in comparison with the entire length of the conventional flow path of the pipe portion which generates the bend), so that an injection pressure is uniformly applied to the pipe portion 30 so as to prevent the pipe portion 30 from being bent.

Further, the pipe member 10 having a high quality with no bend shown in FIGS. 3 to 6 can be obtained by being released from the mold after the molten resin is cooled and solidified, that is, taking out the fixed side core 91, opening the split type blocks 92 and 92, knocking up the stripper plate 93 and taking out the movable side core 90. In manufacturing of the pipe member 10 mentioned above, since it is not necessary to inject at the higher pressure than necessary, and no load is applied to the core pin 91c having the small diameter and the large length, it is possible to prevent the forming die from being broken, and it is possible to prevent the burr from being generated due to the abrasion of the forming die. Accordingly, the quality of the pipe member 10 can be improved.

In the liquid filler extruding container 1 provided with the pipe member 10 having no bend mentioned above, the liquid filler extruded to the leading end side on the basis of the relative rotation between the main body tube 2 and the operating tube 3 is discharged to the brush 50 through the discharge hole 20c and the pipe portion 30 of the pipe member 10. At this time, since no bend is provided in the pipe portion 30 of the pipe member 10, the liquid filler is discharged finely from the desired approximately center position of the brush 50. Therefore, the quality is improved.

Further, in accordance with the present embodiment, since the difference in thickness between the cylinder portion 30a (the cylinder portion with no rib 40) in the leading end side of the pipe portion 30 and the cylinder portion 30b including the rib 40 in the rear end side therefrom is approximately constituted only by the portion of the rib 40, the thickness can be uniformed between the leading end side and the rear end side in comparison with the structure in which the cylinder portion (the cylinder portion 30b in the present embodiment) including the ribs is formed as the thick cylinder so as to make it easy to flow the molten resin, the injecting pressure is uniformly applied to the pipe portion 30, it is possible to inhibit the thickness shrink (including the void) which may be generated due to the large thickness difference from being generated, and the rigidity of the pipe portion 30 is increased by the ribs 40. Accordingly, the quality is further improved.

Further, since the rib 40 is structured such that the length in the radial direction (the length in the protruding direction) is gradually longer from the leading end toward the rear end, it is possible to make it easy to quickly flow the molten rein toward the leading end, and the pipe portion is further prevented from being bent.

Further, since the structure is made such that the approximately entire length of the cylinder portion 30a in the leading end side having no rib 40 in the pipe portion 30 is inserted to the brush 50 (the pipe portion in the leading end side from the ribs 40 hardly has the portion which is not inserted to the brush 50) the ribs 40 which are formed as the flow path for the molten resin and has the maximum flow rate is elongated to the maximum in the axial direction, and the pipe portion 30 is further prevented from being bent.

Further, since three ribs 40 are approximately uniformly arranged in the peripheral direction, it is possible to effectively obtain both the advantages that the pipe portion 30 is prevented from being bent, and the thickness shrink is inhibited from being generated. In this connection, in the case that the number of the ribs 40 is set to be four or more, it is possible to effectively prevent the pipe portion 30 from being bent, however, the thickness shrink tends to be generated. On the other hand, in the case that the number of the rib 40 is set to two, it is possible to effectively inhibit the thickness shrink from being generated, however, there is a risk that the pipe portion 30 is bent.

In this case, the liquid filer extruding container is not limited to the structure in accordance with the first embodiment, for example, as described in Japanese Unexamined Patent Publication No. 2000-262324, there may be provided a liquid filler extruding container in which an outer structure is provided with a cylindrical main body tube having a filling region in which a liquid filer is filled in an inner portion, and a closed-end cylindrical operating tube formed in a rear end portion of the main body tube so as to be relatively rotatable, a liquid filler extruding mechanism is provided with a rotation prevention formed in an inner peripheral surface of the operating tube so as to extend in an axial direction, a cylindrical first tubular body engaged within the main body tube so as not to be rotatable (so as to be synchronously rotatable) and having a female thread formed in an inner peripheral surface thereof and a ratchet gear provided in a rear end surface thereof, a second tubular body arranged between the first tubular body and the rotation prevention of the operating tube, having a ratchet gear engaging with the ratchet gear of the first tubular body in a leading end thereof and engaged with the operating tube so as not to be rotatable, a spring arranged between the second tubular body and the rotation prevention of the operating tube and energizing the second tubular body toward the first tubular body in such a manner that the ratchet gears are engaged with each other, and a movable body received in the operating tube and the main body tube so as to pass through the first and second tubular bodies and the spring and having a male screw engaging with the female thread of the first tubular body and a rotation prevention engaging with the rotation prevention of the operating tube formed in an outer peripheral surface so as to extend in an axial direction, and when a user relatively rotates the main body tube and the operating tube, the movable body moves straight toward a leading end side in accordance with an engaging mechanism constituted by the male screw of the movable body and the female thread of the first tubular body, a rotation preventing mechanism constituted by the rotation prevention of the operating tube and the rotation prevention of the movable body, and a ratchet mechanism constituted by the ratchet gears of the first and second tubular bodies and the spring and allowing one-way rotation, and a piston provided in the leading end of the movable body slides in the filling region in a watertight manner in accordance with the straight movement, thereby sequentially extruding the liquid filler within the filling region. Further, the structure is not limited to these rotary type liquid filer extruding container, but may be applied to, for example, a knock type liquid filler extruding container or the like.

In this case, the liquid filler extruding container to which the pipe member is applied is not limited to the structure having the mechanical extruding mechanism as mentioned above. In the following second embodiment, a description will be given of an application to a squeeze type liquid filler extruding container having no mechanical extruding mechanism, for example, for a tube, a soft bottle or the like.

Figure 12:
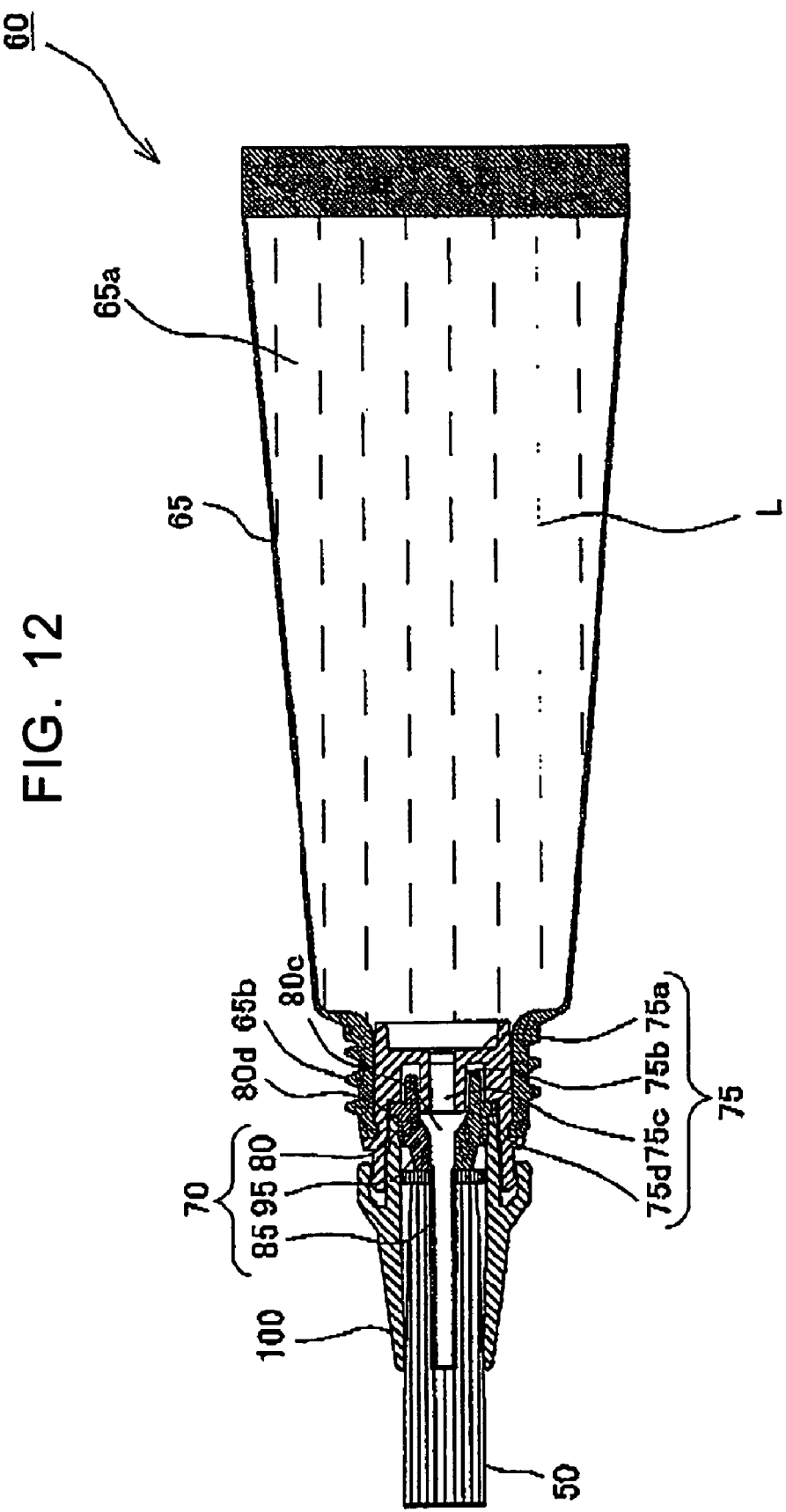
FIG. 12 is a longitudinal cross sectional view showing a liquid filler extruding container provided with a pipe member in accordance with a second embodiment of the present invention.
Figure 13:
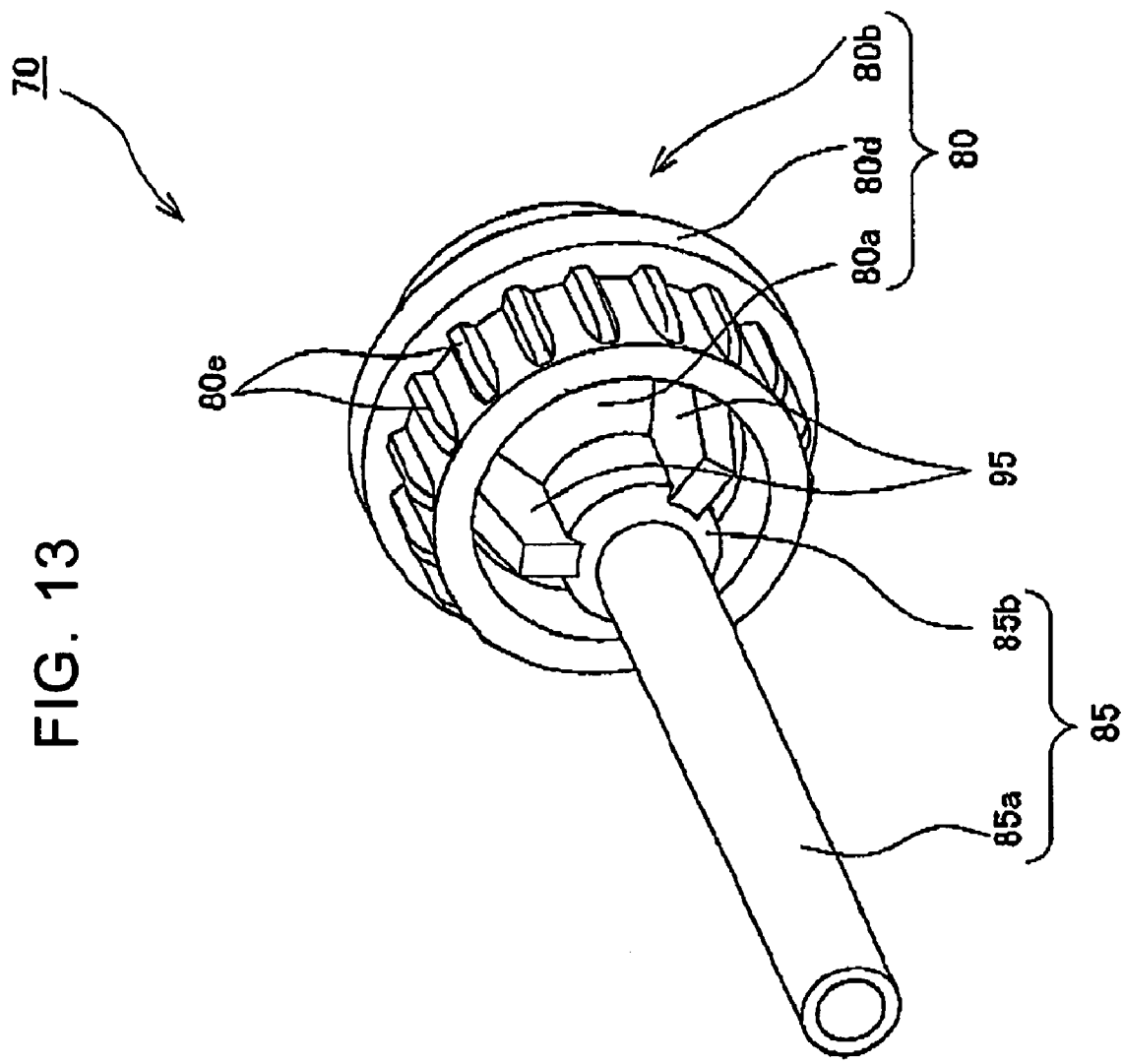
FIG. 13 is a forward perspective view showing the pipe member in FIG. 12.
Figure 14:
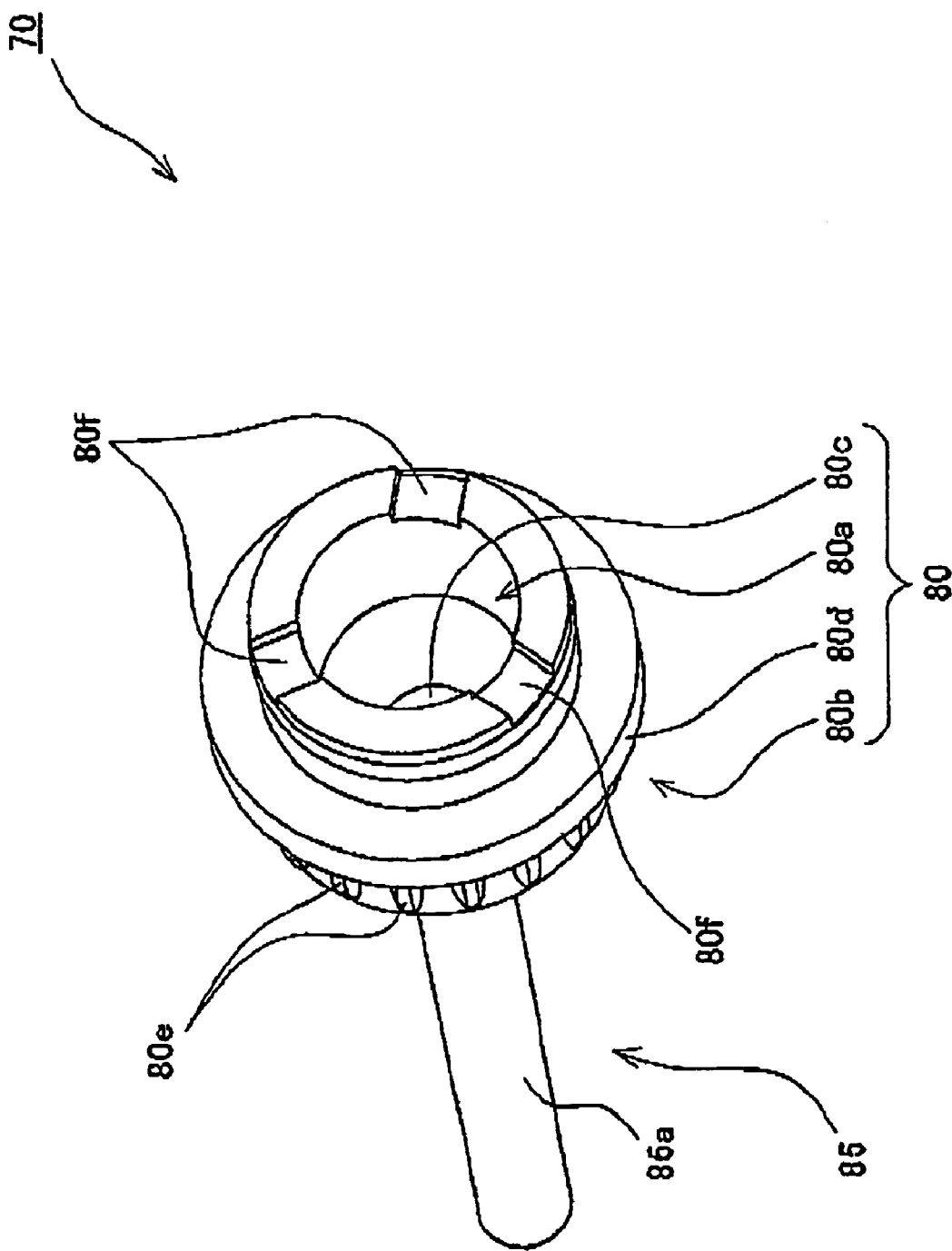
FIG. 14 is a backward perspective view showing the pipe member in FIG. 12.

FIG. 12 is a longitudinal cross sectional view showing a liquid filler extruding container provided with a pipe member in accordance with the second embodiment of the present invention, FIG. 13 is a forward perspective view showing the pipe member in FIG. 12, and FIG. 14 is a backward perspective view showing the pipe member in FIG. 12.

In a liquid filler extruding container 60 in accordance with the second embodiment, as shown in FIG. 12, a filling region 65a in which the liquid filler L is filled is defined within a soft container (a tube is illustrated in FIG. 12) 65 such as a tube, a soft bottle or the like, and when the user pinches and pushes the container 65 by fingers, the liquid filler L in the filling region 65 is extruded to a leading end side.

A pipe member 70 in accordance with the embodiment is attached to a leading end of the container 65 via a pipe member holder 75. The pipe member holder 75 is structured in an approximately cylindrical shape, and is provided with an inner compartment 75a within the tube. A tubular portion 75b is provided in a standing manner in a center of the inner compartment 75, and a through hole 75c within the tube of the tubular portion 75b is formed as a discharge hole for discharging the liquid filler L in the filling region 65a to the leading end side. Further, the pipe member holder 75 is provided with a step portion 75d for attaching the pipe member 70 within the tube. The pipe member holder 75 is inside inserted to the leading end of the container 65 so as to be fitted in a watertight manner, and a rear side from a rear end surface of the inner compartment 75a is formed as the filing region 65a.

The pipe member 70 is constituted by an injection molded product which is integrally provided with a holder portion 80 attached to the pipe member holder 75, a pipe portion 85 supported to the holder portion 80 and a plurality of ribs 95 provided at a predetermined position in an outer periphery of the pipe portion 85, as shown in FIGS. 12 to 14.

The holder portion 80 is provided with a lid portion 80a in which a rear end side is formed in an approximately cylindrical shape and a leading end side is formed in an approximately cone-shape with a taper toward the leading end, and an installation portion 80b continuously provided in a peripheral edge portion of the lid portion 80a. As shown in FIG. 12, the lid portion 80a is structured in such a magnitude that it can be inside inserted to the tube of the pipe member holder 75 and an approximately cylindrical portion in a rear end side of the lid portion 80a can be outside inserted to the tubular portion 75b of the pipe member 75. As shown in FIGS. 12 and 14, a discharge hole 80c for discharging the liquid filler from the discharge hole 75c of the tubular portion 75b of the pipe member holder 75 further to the leading end side is provided in a center of the lid portion 80a.

The installation portion 80b is structured in an approximately cylindrical shape protruding toward the leading end side from the peripheral edge portion of the lid portion 80a, as shown in FIGS. 12 to 14, is provided with an annular collar portion 80d in an outer peripheral surface thereof, and is provided with a plurality of protrusions 80e for attaching a brush holder 100 in a position in a leading end side from the annular collar portion 80d so as to extend in an axial direction and along a peripheral direction.

The pipe portion 85 is structured, as shown in FIGS. 13 and 14, such that a thin and small-diameter cylindrical portion 85a in a leading end side is formed longer in comparison with a cylinder portion 85b which is formed in a rear side so as to have a somewhat larger inner diameter and thickness than the cylinder portion 85a. Further, a rear end of the cylinder portion 85b is continuously provided with the lid portion 80a of the holder portion 80 as shown in FIG. 13, and communicates with the discharge hole 80c, as shown in FIGS. 12 and 14.

The ribs 95 are structured, as shown in FIG. 13, in the same manner as the first embodiment, such that three ribs are continuously provided in an outer peripheral surface of the cylinder portion 85b of the pipe portion 85 at an approximately uniform interval (at approximately 120 degree) in a circumferential direction so as to protrude in a radial direction, and are continuously provided so as to reach the lid portion 80a of the holder portion 80. In the ribs 95, a length in a radial direction is set to be gradually longer toward a rear end from a leading end.

As shown in FIG. 12, the pipe member 70 having the structure mentioned above is inside inserted to the tube of the pipe member holder 75, the approximately cylindrical portion in the rear end side of the lid portion 80a is outside inserted to the tubular portion 75b of the pipe member holder 75, and the annular collar portion 80d is brought into contact with the step portion 75d of the pipe member holder 75 so as to be fitted in a watertight manner within the pipe member holder 75.

Further, in the approximately cylindrical brush holder 100 provided with the brush 50, a rear end surface thereof is brought into contact with the annular collar portion 80d of the pipe member 70, and the protrusion 80e of the installation portion 80b of the pipe member 70 enters into a plurality of recess portions (not shown) formed along the inner peripheral surface of the rear end portion and extending in an axial direction, whereby the approximately cylindrical brush holder 100 is attached to the pipe member 70 so as not to be rotatable.

Further, in this state, the pipe member 70 is set in a state in which the cylinder portion 85a (the portion having no rib 95) in the leading end side of the pipe portion 85 is inserted to a middle of the brush 50, and the leading end of the pipe member 70 is positioned near the leading end surface of the brush holder 100.

The pipe member 70 having the structure mentioned above is injection molded by setting a position 80f (refer to FIG. 14) corresponding to the rib 95 in the rear end surface of the holder portion 80 to a resin injecting position, in the same manner as the first embodiment. Accordingly, needless to say, the obtained pipe member 70 achieves the same effects and operations as those of the first embodiment.

In this case, as shown in FIG. 12, the male screw 65b is formed in an outer peripheral surface of the leading end portion of the container 65 and is engaged with the female thread formed in an inner peripheral surface in an open end of a cap (not shown), whereby the cap is detachably mounted to the container 65.

As mentioned above, the description is given in particular of the present invention on the basis of the embodiments, however, the present invention is not limited to the embodiments mentioned above. For example, in the embodiments mentioned above, the number of the ribs 40 and 95 is set to three as the particularly preferable structure, however, the number may be set to two, four or more. As a forming die in this case, in the same manner as the embodiment mentioned above, there is employed a structure in which the resin injecting port is provided at the positions corresponding to two, four or more ribs.

Further, the rib is not limited to the embodiment mentioned above, and the point is that each of the ribs is formed in a shape which can extrude the molten resin supplied during the injection toward the leading end side of the pipe portion at approximately the same time and at approximately an equivalent amount.

In this case, in the embodiment mentioned above, since it is particularly preferable to uniformly apply the injection pressure to the pipe portions 30 and 85, the resin injecting positions of the pipe members 10 and 70 are set to the positions 20f and 80f corresponding to the ribs 40 and 95 in the rear end surfaces of the holder portions 20 and 80. However, the positions may be set to positions which do not correspond to the ribs 40 and 95 in the rear end surfaces of the holder portions 20 and 80, and further may be provided in the peripheral surfaces, the leading end surfaces or the like of the holders 20 and 80. The point is that it is necessary that the resin injecting position of the pipe member exists on the surface of the other portion than the pipe portion and the rib. Accordingly, in order to manufacture the pipe member mentioned above, there is employed a forming die which is provided with a shape corresponding to the shape of the pipe member and has the resin injecting port on the surface corresponding to the other portions than the pipe portion and the rib.

What is claimed is:

1. A manufacturing method of the pipe member for supplying a liquid filler filled in a filling region in an inner portion of a container and extruded toward a leading end side, to a brush in a leading end of the container, comprising the steps of:

providing said pipe member with:

a holder portion which is attached to the inner portion of said container and is provided with a lid portion that defines a leading surface of said filling region, said lid portion being provided with a discharge hole for discharging said liquid filler in said filling region to the leading end side;

a pipe portion extending from said lid portion to the leading side and having a rear end and a leading end, said rear end being communicated with said discharge hole and said leading end being inserted into said brush; and a plurality of ribs which are provided in an outer periphery of the pipe portion at an approximately uniform interval in a peripheral direction, protrude in a radial direction and reach said lid portion from a middle position in an axial direction of the pipe portion, said ribs being protruded so that the length in the radial direction of said ribs is gradually made longer toward said lid portion from the middle position;

preparing a molding die, which is provided with a molding interior corresponding to a configuration of said pipe member and has a resin injecting portion on a surface corresponding to a position corresponding to said ribs on a rear end surface of said lid portion;

forming said molding die by assembling a movable side core which forms outer peripheral surfaces of said pipe portion and ribs, and a inner peripheral side surface of an installation portion of said holder portion, a fixed side core which forms an inner peripheral surface of said pipe portion, the rear end surface of said lid portion of said holder portion, and split type blocks which form an outer peripheral surface of said installation portion of said holder portion;

injecting a molten resin into the molding interior of said molding die through said resin injecting port in said fixed side core of said molding die; and releasing said pipe member from the die after being solidified.

* * * * *